US010627027B1

(12) United States Patent
Hutchinson

(10) Patent No.: US 10,627,027 B1
(45) Date of Patent: Apr. 21, 2020

(54) METHOD AND APPARATUS FOR DIRECTING AND CONTAINING LEAKAGE

(71) Applicant: Brett Hutchinson, Walker, LA (US)

(72) Inventor: Brett Hutchinson, Walker, LA (US)

( * ) Notice: Subject to any disclaimer, the term of this patent is extended or adjusted under 35 U.S.C. 154(b) by 157 days.

(21) Appl. No.: 15/608,613

(22) Filed: May 30, 2017

Related U.S. Application Data

(60) Provisional application No. 62/342,785, filed on May 27, 2016.

(51) Int. Cl.
  *F16L 23/02* (2006.01)
  *F16L 23/00* (2006.01)
  *F16L 55/168* (2006.01)

(52) U.S. Cl.
  CPC ............ *F16L 23/006* (2013.01); *F16L 23/02* (2013.01); *F16L 55/168* (2013.01)

(58) Field of Classification Search
  CPC ........ F16L 23/02; F16L 55/168; F16L 23/006
  USPC ......................................................... 285/45
  See application file for complete search history.

(56) References Cited

U.S. PATENT DOCUMENTS

| | | | | |
|---|---|---|---|---|
| 798,649 | A * | 9/1905 | Willink | F16L 23/167 |
| | | | | 285/13 |
| 849,395 | A * | 4/1907 | Hinsdill | H02G 3/085 |
| | | | | 16/108 |
| 1,896,225 | A * | 2/1933 | Dyer | F16L 23/00 |
| | | | | 285/187 |
| 3,387,867 | A | 6/1968 | Rogers | |
| 4,232,736 | A | 11/1980 | Pillette | |
| 4,300,373 | A * | 11/1981 | Camos | E21B 33/03 |
| | | | | 166/113 |
| 4,403,794 | A | 9/1983 | Curran et al. | |
| 4,405,161 | A * | 9/1983 | Young | E21B 33/03 |
| | | | | 137/382 |
| 4,458,521 | A | 7/1984 | Pillette | |

(Continued)

FOREIGN PATENT DOCUMENTS

WO 2003/062693 7/2003

*Primary Examiner* — David Bochna
*Assistant Examiner* — James A Linford
(74) *Attorney, Agent, or Firm* — Garvey, Smith & Nehrbass, Patent Attorneys, L.L.C.; Vanessa M. D'Souza; Charles C. Garvey, Jr.

(57) ABSTRACT

The present invention includes an apparatus and method for capturing leakage from a flanged joint that includes a bolted connection of flanged pipe or flanged tubing sections and flanges such as weld neck flanges. The invention includes a removable housing having a curved section and a pair of straight sections. The housing can have first and second fluid flow channels. The housing can be sized and shaped to receive a bolted flanged connection of two flanged pipe or tubing sections. Two of the flanged pipe sections can extend in generally opposite directions from the housing. The housing walls can contain any leakage from the flanged bolted connection. The contained leakage can flow into one or both of said channels. One or more locks can removably secure the housing to the flanged joint. Specially configured panels can be used to lock the housing to the flanged, bolted connection. Openings enable pipe sections to extend from the flanges in opposing direction. The panels are positioned on opposing sides of the housing. The panels can be rotated to: 1) expose the bolts of the bolted connection, or 2) cover the bolts of the bolted connection.

15 Claims, 9 Drawing Sheets

(56) References Cited

U.S. PATENT DOCUMENTS

| | | | |
|---|---|---|---|
| 4,466,273 | A | 8/1984 | Pillette |
| 5,056,830 | A | 10/1991 | Reaux |
| 5,492,373 | A | 2/1996 | Smith |
| 5,678,864 | A | 10/1997 | Brown |
| 5,983,924 | A | 11/1999 | Hodgkinson |
| 6,467,811 | B2 | 10/2002 | Mitchell |
| 6,712,403 | B1 | 3/2004 | Dusevic |
| 7,458,618 | B2 | 12/2008 | Mahnken et al. |
| 8,439,060 | B1 | 5/2013 | Jackson |
| 9,062,810 | B2 | 6/2015 | Wilson |
| 2009/0302598 | A1 * | 12/2009 | Tsubota ............ F16L 19/005 285/45 |
| 2012/0193907 | A1 | 8/2012 | Skarbovig |

* cited by examiner

METHOD AND APPARATUS FOR DIRECTING AND CONTAINING LEAKAGE

CROSS-REFERENCE TO RELATED APPLICATIONS

This application claims benefit of U.S. Provisional Patent Application Ser. No. 62/342,785, filed 27 May 2016, which is hereby incorporated herein by reference.

Priority of U.S. Provisional Patent Application Ser. No. 62/342,785, filed 27 May 2016, which is incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to methods, systems, assemblies, and apparatuses for directing leakage from flanged connections of pipe, hose or tubing sections. The present invention also relates to methods, systems, assemblies, and apparatuses for directing leakage from flanged connections of pipe, hose or tubing sections, such as when disassembling bolted flanged connections of pipe or tubing sections.

2. General Background of the Invention

The present invention addresses problems with spills and leaks, such as spills on boats from hoses or pipes from, for example, the unloading of chemicals from barges/boats.

Hoses or pipes transferring fluids under pressure can be joined together by providing a flanged connection at each end, and bolting the flanged connections together. Use of pipes or hoses to transport high-pressure materials can often lead to flange connection leaks and result in damage to vessels or facilities, equipment, or personnel.

A flanged bolted connection in a piping system can be constructed by welding a first flange to a first length of pipe. A second flange can be welded to a second length of pipe. The first flange and the second flange can be bolted together to create a connection between the first pipe and second pipe.

The present invention relates to an improved apparatus for directing and containing leakage from bolted flanged connections of pipe or tubing sections.

The following US Patents/Publications and International Publications are each hereby incorporated herein by reference:

| PAT./PUB NO. | TITLE | ISSUE DATE MM-DD-YYYY |
|---|---|---|
| 3,387,867 | Joint construction | Jun. 11, 1968 |
| 4,232,736 | Leak detection system and control using non-rigid bladder | Nov. 11, 1980 |
| 4,403,794 | Safety shield for flanged pipe couplings | Sep. 13, 1983 |
| 4,458,521 | Leak detection system | Jul. 10, 1984 |
| 4,466,273 | Leak detection system | Aug. 21, 1984 |
| 5,056,830 | Flanged repair coupling for pipeline service | Oct. 15, 1991 |
| 5,492,373 | Wellhead flange for interconnecting a threaded wellhead and a flanged blowout preventer | Feb. 20, 1996 |
| 5,678,864 | Quick disconnect safety shield | Oct. 21, 1997 |
| 5,983,924 | Water diverting device | Nov. 16, 1999 |
| 6,467,811 | Flanged connection repair device and method | Oct. 22, 2002 |
| 6,712,403 | Flange connector | Mar. 30, 2004 |
| 7,458,618 | Fixed flange spray deflector | Dec. 2, 2008 |
| 8,439,060 | Attachable drain collar for plumbing system couplings | May 14, 2013 |
| 9,062,810 | Oil deflection apparatus | Jun. 23, 2015 |
| 2012/0193907 | PIPE COUPLING COVER | Aug. 2, 2012 |
| WO2003/062693 | FLANGE MEMBER COMPRISING A FIRST FLANGED END DESIGNED WITH A, IN A RADIAL DIRECTION, CONCAVE ENDSURFACE AND A FLANGE JOINT COMPRISING FLANGE MEMBERS | Jul. 31, 2003 |

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY OF THE INVENTION

In one embodiment, the present invention includes an apparatus for capturing leakage from a flanged joint that includes multiple bolted connection of flanged pipe or flanged tubing sections comprising a removable housing that can have a curved section and a pair of straight leg sections. The housing straight leg sections can have first and second fluid flow channels. The housing can be sized and shaped to receive a bolted flanged connection of two pipe or tubing sections, each pipe or tubing section including an annular flange, a bolt circle opening on each flange, and wherein bolted connections connect the flanges together at the bolt circle openings. The housing can have an open throat that can be sized and shaped to receive the flanged sections. In a storage position the housing can contain the flanges and two of the flanged pipe sections can extend in generally opposite directions from the housing. The housing walls can contain any leakage from the flanged connection. The contained leakage can flow into one or both of said channels. One or more locks can removably secure the housing to the flanged joint.

In one embodiment, the invention includes an apparatus for capturing leakage from a flanged joint that includes a bolted connection of flanged pipe or flanged tubing sections and flanges such as weld neck flanges. The invention includes a removable housing having a curved section and a pair of straight sections. The housing can have first and second fluid flow channels. The housing can be sized and shaped to receive a bolted flanged connection of two flanged pipe or tubing sections. Two of the flanged pipe sections can extend in generally opposite directions from the housing. The housing walls can contain any leakage from the flanged bolted connection. The contained leakage can flow into one or both of said channels. One or more locks can removably secure the housing to the flanged joint. Specially configured panels can be used to lock the housing to the flanged, bolted connection. Openings enable pipe sections to extend from the flanges in opposing direction (see FIG. 22). The panels are positioned on opposing sides of the housing. The panels can be rotated to: 1) expose the bolts of the bolted connection (see FIG. 1-2), or 2) cover the bolts of the bolted connection (see FIG. 9).

In one embodiment, the invention includes an apparatus for directing leakage from bolted flanged connections of pipe or tubing sections. The invention includes a removable housing that can have a curved section, plurality of straight sections, and an interior channel. In a first position, the housing can be sized and shaped to allow for a bolted flanged connection of two pipe or tubing sections to be placed between the straight sections. In the first position the curved section can be adjacent to the two pipe or tubing sections and the plurality of straight sections can extend beyond the bolted flanged connection. A panel can be sized and shaped to fit between the two straight sections of the housing, the panel can have a first curved edge and a second curved edge. A lock can removably secure the panel in a first position where the first curved edge can be adjacent to the two pipe or tubing sections such that the circumference of the two pipe or tubing sections can be adjacent to the housing along the curved section and the first curved edge of the panel. The lock can removably secure the panel in a second position where the second curved edge can be positioned below the flanged connection such that a portion of the bolted flanged connection is visible.

In one embodiment, the present invention comprises an apparatus for directing leakage from bolted flanged connections of pipe or tubing sections. The apparatus preferably comprises a housing that can slide over the flanges/bolts to direct any leakage, and at least two removable panels or doors. The removable panels or doors preferably lock or click to indicate to the user that the apparatus is properly placed. Preferably the housing is sized such that it will not fit over a bolted connection unless the bolts are properly tightened. The apparatus preferably can be rotated about the flanged connection allowing the user to change the direction of flow of a leak or spill out of the open end of the housing and into a nearby drip pan or other container.

In various embodiments are provided an apparatus for directing leakage from bolted flanged connections of pipe or tubing sections comprising:
  a removable housing including a curved section, plurality of straight sections, and an interior channel;
  wherein the housing can be sized and shaped to allow for a correctly bolted flanged connection of two pipe or tubing sections to be placed between the straight sections such that the curved section is adjacent to the two pipe or tubing sections and the plurality of straight sections extends beyond the bolted flanged connection;
  a panel (i.e., removable door) sized and shaped to fit between the two straight sections of the housing having a first curved edge and a second curved edge; and
  a lock that can removably secure the panel in a first position where the first curved edge is adjacent to the two pipe or tubing sections such that the circumference of the two pipe or tubing sections are adjacent to the housing along the curved section and the first curved edge of the panel, and wherein the lock can removably secure the panel in a second position where the second curved edge is positioned below the flanged connection such that a portion of the bolted flanged connection is visible.

In various embodiments, the curved section of the housing has a curvature matching the bolted flanged connections.

In various embodiments, the interior channel continuously extends through the curved section and plurality of straight sections.

In various embodiments, the interior channel has a width that is at least equal to the width of a bolt head of the bolted flanged connections.

In various embodiments, the housing includes a plurality of interior channels.

In various embodiments, the apparatus further includes a plurality of panels.

In various embodiments, the first curved edge has a curvature that is different from the second curved edge.

In various embodiments, the apparatus further includes a plurality of locks.

In various embodiments, the lock can be a spring lock, locking pin, locking mechanism, or anything similar that locks the device in place.

In various embodiments, the spring lock comprises a plurality of pins and a spring such that in an extended state the spring applies a springing force pushing the plurality of pins outward and in a retracted state an opposing force overcoming the springing force to pushes the plurality of pins inward.

In various embodiments, the housing and panel include a plurality of openings for receiving the plurality of pins in the extended state.

In various embodiments, the plurality of openings of the housing and panel align such that the plurality of pins in the extended state received through the plurality of openings removably secures the panels in either the first or second positions.

In various embodiments, the plurality of openings of the housing are between the interior channel and outer surface of the housing such that the spring is located within the interior channel when the spring lock removably secures the panels in either the first or second positions.

In various embodiments are provided an assembly for containing leakage from bolted flanged connections of pipe or tubing sections comprising:
  a removable housing including a curved section, plurality of straight sections, and an interior channel;
  wherein the housing is sized and shaped to allow for a correctly bolted flanged connection of two pipe or tubing sections to be placed between the straight sections such that the curved section is adjacent to the two pipe or tubing sections and the plurality of straight sections extends beyond the bolted flanged connection;
  a panel sized and shaped to fit between the two straight sections of the housing having a first curved edge and a second curved edge;
  a lock that can removably secure the panel in a first position where the first curved edge is adjacent to the two pipe or tubing sections such that the circumference of the two pipe or tubing sections are adjacent to the housing along the curved section and the first curved edge of the panel and that can removably secure the panel in a second position where the second curved edge is positioned below the flanged connection such that a portion of the bolted flanged connection is visible; and
  a stationary container positioned beneath the housing.

In various embodiments are provided a method for directing leakage from bolted flanged connections of pipe or tubing sections comprising the steps of:
provided a removable housing including a curved section, plurality of straight sections, and an interior channel;
wherein the housing can be sized and shaped to allow for a bolted flanged connection of two pipe or tubing sections to be placed between the straight sections such that the curved section is adjacent to the two pipe or tubing sections and the plurality of straight sections extends beyond the bolted flanged connection;
providing a plurality of panels sized and shaped to fit between the two straight sections of the housing having a curved edge;
placing the housing over the bolted flanged connection; and
securing the plurality of panels to the housing such that the curved edge of the plurality of panels are adjacent to the two pipe or tubing sections such that the circumference of the two pipe or tubing sections are adjacent to the housing along the curved section and the curved edge of the plurality of panels.

In various embodiments, the method further includes the step of directing leakage within the housing to a container. One embodiment of the present invention directs the leakage to a drip barrel or other such containment device preferably at an angle of between about 0 degrees and 75 degrees relative to the horizontal line around where the straight sections intersect with the curved section or around where the pipes or tubing sections are in the interior channel.

In various embodiments, the plurality of panels are secured to the housing with a plurality of spring locks located in the interior channel and including a plurality of pins and a spring such that in an extended state the spring applies a springing force pushing the plurality of pins outward and in a retracted state an opposing force overcoming the springing force to pushes the plurality of pins inward.

In various embodiments, the step of securing the panel to housing further includes transitioning the plurality of spring locks to the retracted state, positioning the panel between the straight sections, and transitioning the plurality of spring locks to the extended state such that the plurality of spring locks removably secures the plurality of panels to the housing.

In various embodiments are disclosed a method of disassembling bolted flanged connections of pipe or tubing sections comprising the step of:
providing a removable housing including a curved section, plurality of straight sections, and an interior channel;
wherein the housing is sized and shaped to allow for a bolted flanged connection of two pipe or tubing sections to be placed between the straight sections such that the curved section is adjacent to the two pipe or tubing sections and the plurality of straight sections extends beyond the bolted flanged connection;
providing a plurality of panels sized and shaped to fit between the two straight sections of the housing having a curved edge;
placing the housing over the bolted flanged connection;
securing the plurality of panels to housing where the curved edge is positioned below the flanged connection such that a portion of the bolted flanged connection is visible;
rotating the housing such that different portions of the bolted flanged connection are visible; and
removing bolts from the bolted flanged connection at the visible portions such that fluid remaining in the bolted flanged connection is directed by the housing.

In various embodiments are disclosed a method for directing leakage from bolted flanged connections of pipe or tubing sections and disassembling bolted flanged connections comprising the steps of:
providing a removable housing including a curved section, plurality of straight sections, and an interior channel;
wherein the housing is sized and shaped to allow for a bolted flanged connection of two pipe or tubing sections to be placed between the straight sections such that the curved section is adjacent to the two pipe or tubing sections and the plurality of straight sections extends beyond the bolted flanged connection;
providing a plurality of panels sized and shaped to fit between the two straight sections of the housing having a first curved edge and a second curved edge;
placing the housing over the bolted flanged connection;
securing the plurality of panels to housing such that the first curved edge of the plurality of panels are adjacent to the two pipe or tubing sections such that the circumference of the two pipe or tubing sections are adjacent to the housing along the curved section and the first curved edge of the plurality of panels,
wherein leakage from the bolted flanged connection is directed by the housing;
wherein leakage is directed by the housing to a containment device or drip pan, and wherein the leakage is directed to the drip pan at an angle of about 0 to 75 degrees relative to the horizontal line around where the straight sections intersect with the curved section;
when flow through the bolted flanged connection is completed, securing the plurality of panels to housing where the curved edge is positioned below the flanged connection such that a portion of the bolted flanged connection is visible;
rotating the housing such that different portions of the bolted flanged connection are visible; and
removing bolts from the bolted flanged connection at the visible portions such that fluid remaining in the bolted flanged connection is directed by the housing.

In various embodiments are disclosed a system for directing leakage from bolted flanged connections of pipe or tubing sections comprising:
a removable housing including a curved section, plurality of straight sections, and an interior channel;
wherein the housing is sized and shaped to allow for a bolted flanged connection of two pipe or tubing sections to be placed between the straight sections such that the curved section is adjacent to the two pipe or tubing sections and the plurality of straight sections extends beyond the bolted flanged connection;
a plurality of panels sized and shaped to fit between the two straight sections of the housing having a first curved edge and a second curved edge; and
a lock that can removably secure the plurality of panels in a first position where the first curved edge is adjacent to the two pipe or tubing sections such that the circumference of the two pipe or tubing sections are adjacent to the housing along the curved section and the first curved edge of the plurality of panels and that can removably secure the plurality of panels in a second position where the second curved edge is positioned below the flanged connection such that a portion of the bolted flanged connection is visible;

wherein the housing is placed over the bolted flanged connection and the plurality of panels are secured to the housing in the first position such that leakage from the bolted flanged connection is directed by the housing.

In various embodiments, the housing directs leakage to a container, wherein the leakage is directed to the drip pan at an angle of about 0 to 75 degrees relative to the horizontal line around where the straight sections intersect with the curved section.

In various embodiments, the removable housing is rotatable to the direction of the fluid flowing through the pipe/tubing.

In various embodiments, the plurality of panels are secured to the housing in the second position and the housing is rotated such that different portions of the bolted flanged connection are visible where bolts are removed from the bolted flanged connection at the visible portions of the bolted flanged connection such that fluid remaining in the bolted flanged connection is directed by the housing.

In various embodiments are disclosed an apparatus for directing leakage from bolted flanged connections of pipe or tubing sections comprising:
 a removable U-shaped housing with one curved section and two straight sections including a top wall;
 front and rear walls perpendicularly extending from the top wall;
 two lip sections perpendicularly extending from the front and rear walls;
 wherein a first portion of the top wall, front wall, and bottom wall extending from the front wall define a first channel;
 wherein a second portion of the top wall, rear wall, and lip section extending from the rear wall define a second channel; and
 wherein the housing is sized and shaped to allow for a bolted flanged connection of two pipe or tubing sections to be placed between the straight sections such that the lip section of the housing along the curved section are adjacent to the two pipe or tubing sections and the straight sections extends beyond the bolted flanged connection;
 two panels sized and shaped to fit between the two straight sections of the housing adjacent to the bottom portion of the housing and the two lip sections and having a first curved edge and a second curved edge; and
 a plurality of locks that can removably secure the two panels in a first position where the first curved edge is adjacent to the two pipe or tubing sections such that the circumference of the two pipe or tubing sections are adjacent to the lip section of the housing along the curved section and first curved edge of the two panels and that can removably secure the two panels in a second position where the second curved edge is positioned below the flanged connection such that a portion of the bolted flanged connection is visible.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
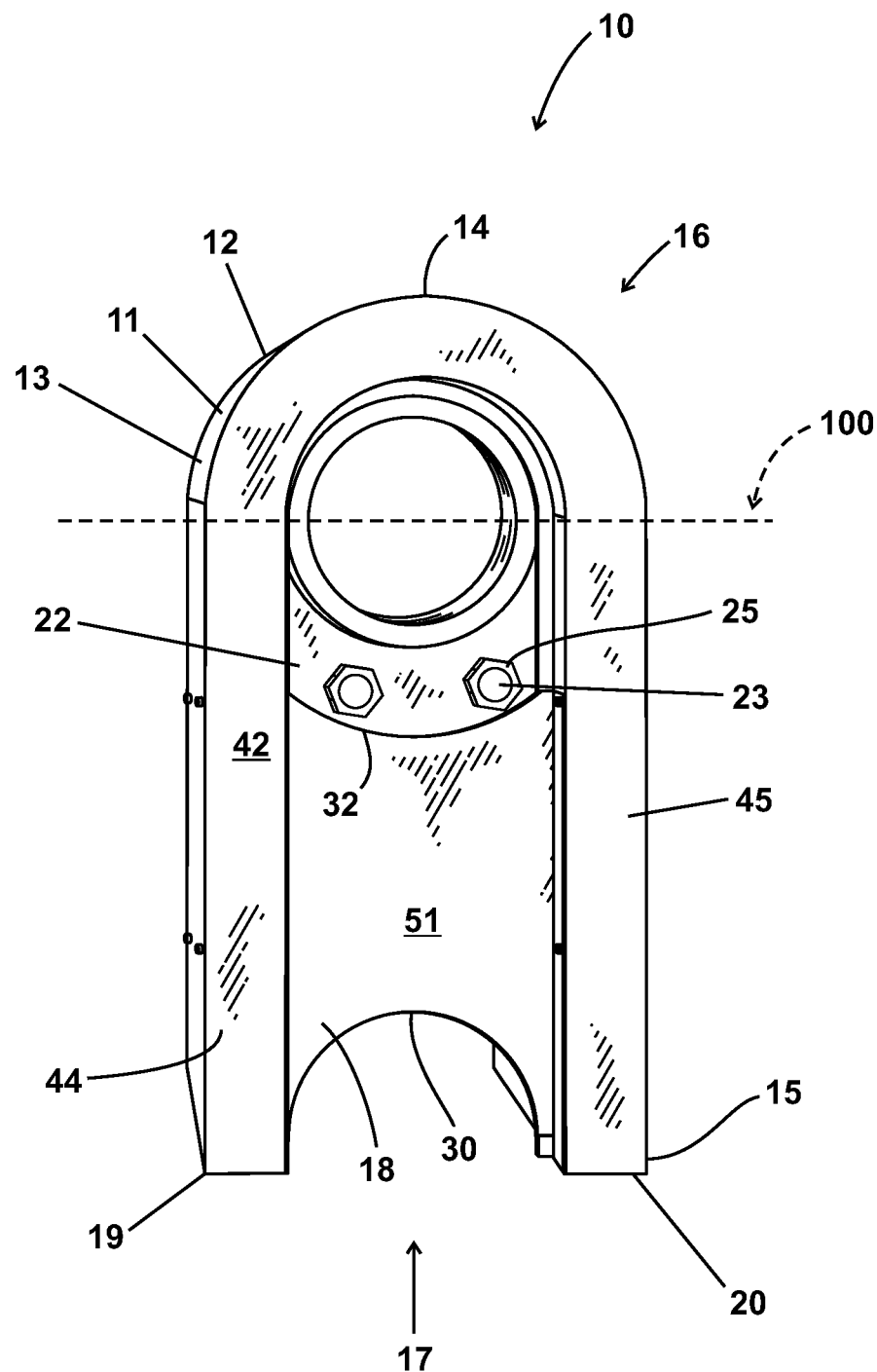
FIG. 1 is a perspective view of a preferred embodiment of the apparatus of the present invention.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

The present invention relates to methods, systems, assemblies, and apparatuses for directing leakage 57 from connections 22 of pipe or tubing sections 40. The present invention also relates to methods, systems, assemblies, and apparatuses for directing leakage 57 from connections 22 of pipe or tubing sections 40 when disassembling bolted flanged connections of pipe or tubing sections 40. One embodiment of the present invention is an apparatus comprised of a tool 10 that can slide over the flanges 55, 56, bolts 23, and nuts 25 to direct any leakage 57. The tool 10 preferably locks in and can click to indicate to the user that it is locked. The tool 10 preferably can be rotated to the direction of flow and can preferably have channels 48, 49 that can contain and direct the flow of leaks. In one embodiment of the present invention, the invention preferably rotates and can fit preferably two flanges 55, 56.

Flanges 55, 56 can be flanges such as neck weld flanges (see FIG. 11) that can be welded to pipes 40.

Figure 9:
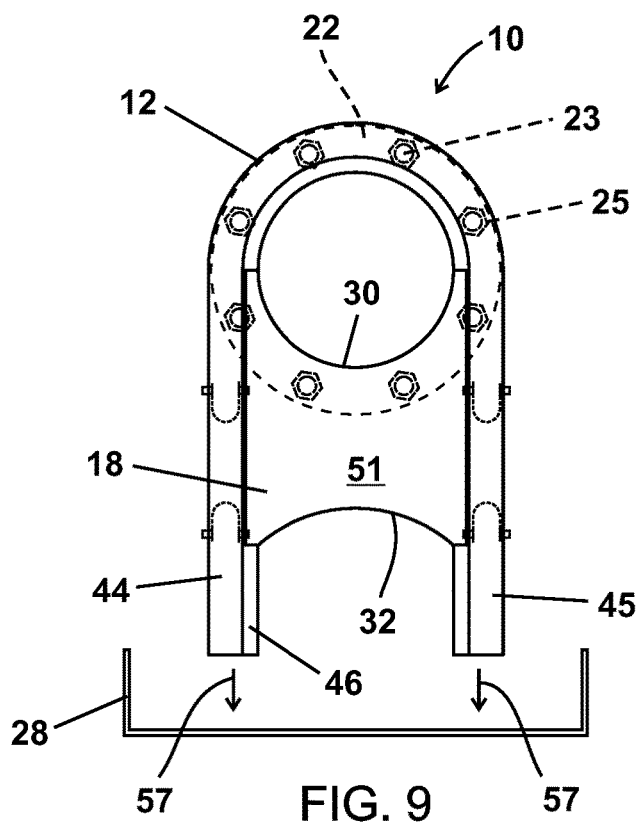
FIG. 9 is a front view of a preferred embodiment of the apparatus of the present invention with panels in a no-access position and placed on a bolted flanged connection.
Figure 22:
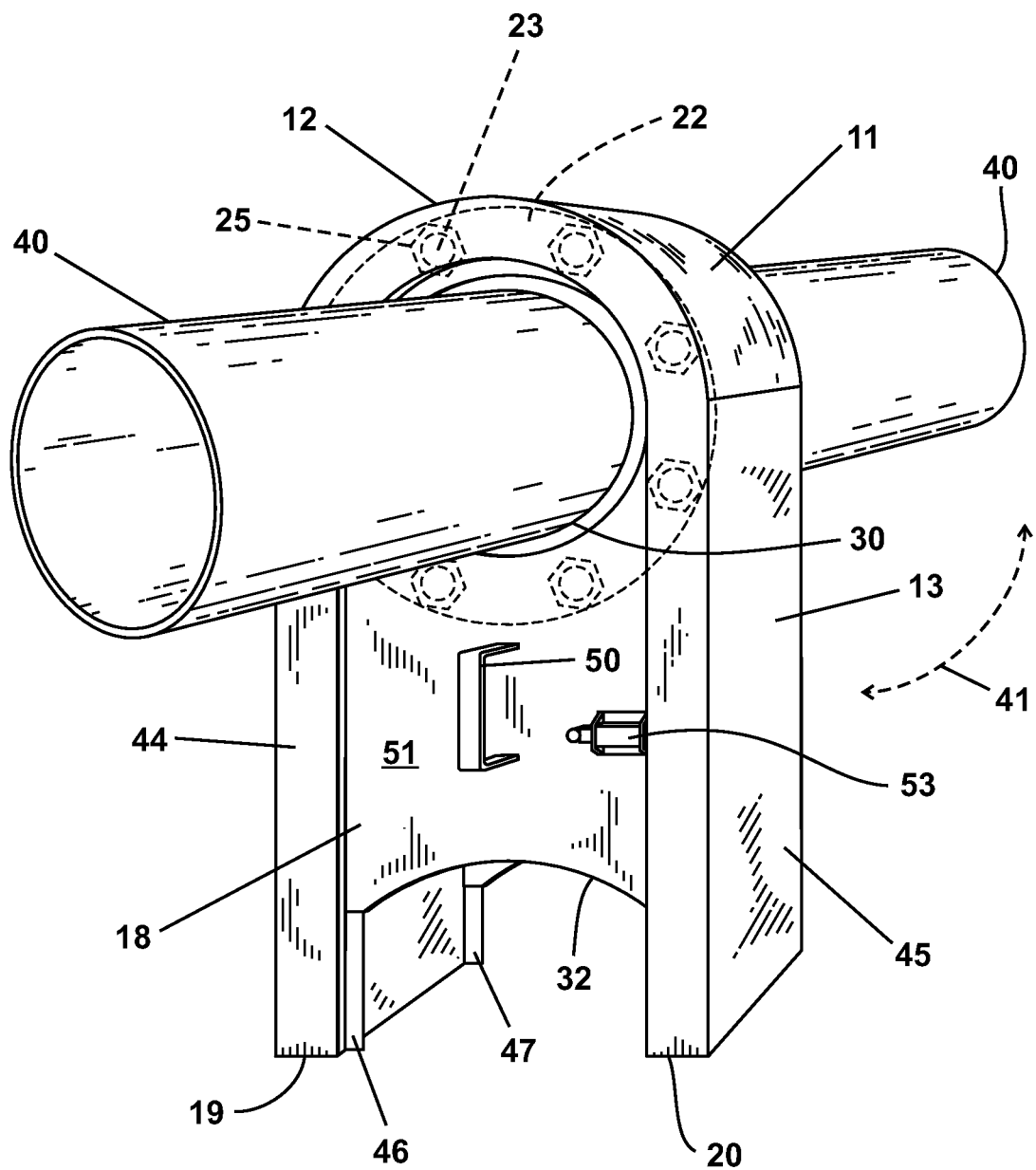
FIG. 22 is a perspective view of a preferred embodiment of the apparatus of the present invention with panels in a no-access position and placed on a bolted flanged connection of two pipe or tubing sections.

In one embodiment, the invention includes an apparatus for capturing leakage 57 from a flanged joint that includes a bolted connection 22 of flanged pipe or flanged 55, 56 tubing sections 40. The invention includes a removable housing 12 having a curved section 11 and a pair of straight sections 44, 45. The housing 12 can have first and second fluid flow channels 48, 49. The housing 12 can be sized and shaped to receive a bolted flanged connection 22 of two pipe or tubing sections 40. Two of the flanged pipe sections 40 can extend in generally opposite directions from the housing, as seen in FIG. 22. The housing walls 13, 42, 43, 46, 47 can contain any leakage 57 from the flanged connection 22. The contained leakage can flow into one or both of said channels 48, 49. One or more locks 26 can removably secure the housing 12 to the flanged joint 22. Specially configured panels 19 can be used to lock the housing to the flanged, bolted connection 22. Openings 52 enable pipe sections 40 to extend from the flanges 55, 56 in opposing direction (see FIG. 22). The panels 18 are positioned on opposing sides of the housing 12. The panels 18 can be rotated to: 1) expose the bolts 23 of the flanged bolted connection 22 (see FIG. 1-2), or 2) cover the bolts 23 of the flanged bolted connection (see FIG. 9).

The present invention provides an apparatus for directing leakage 57 from bolted flange connections 22 of pipe or tubing sections 40 and for containing leakage from bolted flange connections 22 of pipe or tubing sections 40 when disassembling bolted flanged connections 22 of pipe or tubing sections 40. The apparatus is designated generally by the numeral 10 in FIG. 1. Apparatus 10 includes a housing 12 and at least one removable panel 18. In one embodiment, the apparatus 10 includes at least two removable panels 18.

A preferred embodiment of the present invention is an apparatus 10 for covering bolted flange connections 22 during fluid transfer (e.g., flanged bolted connections wherein raised face or ring type joint weld neck flanges 55, 56 are connected together). The apparatus 10 includes a housing 12 and at least two removable panels 18, wherein the housing 12 has a top/upper end portion 14, a bottom/lower end portion 15, and a wall 13. Housing 12 can have a curved section 11 and a pair of straight sections 44, 45 that make up the body of housing 12. Wall 13 is an outer wall of housing 12 that can be U-shaped. Housing 12 has a closed side/end 16 and an open side/end or throat 17, the open end or throat 17 can have a first leg 19 and a second leg 20 at the lower end portion 15 of housing 12 (see FIG. 1).

Preferably at least two panels 18 can be sized and shaped to fit in the open side/end or throat 17 of housing 12. Preferably one of the at least two panels 18 can be removably attached to the upper end portion or top 14 of housing 12 and one of the at least two panels 18 can be removably attached to the lower end portion or bottom 15 of housing 12.

As seen in FIGS. 6-7 and 12-13, panel 18 can be flat and have a main section/portion 51, an outer surface 34, an inner surface 36, a first straight edge 37, a second straight edge 38, a first curved edge 30, and a second curved edge 32. Preferably, first and second straight edges 37, 38 correspond to the pair of straight sections 44, 45 of housing 12.

Panel 18 can be placed with the first curved edge 30 facing the closed end 16 of housing 12, as seen in FIGS. 9, 12, 14, 16, 18-19 and 22. First curved edge 30 can be curved such that bolts 23 on bolted flange connection 22 can be covered by the panel 18 when the panel 18 is placed with first curved edge 30 facing the closed side 16 of the housing 12. In this position, the bolts 23 and nuts 25 of the connection 22 are covered, preventing spray or other leaking fluid from escaping the apparatus 10 from anywhere other than the open side/end or throat 17 of housing 12.

Figure 2:
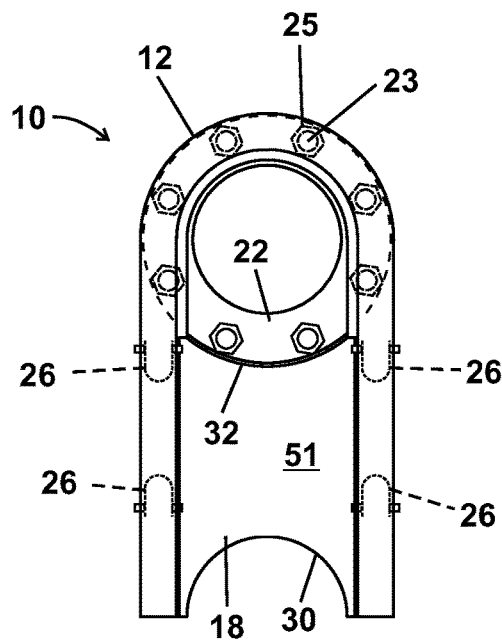
FIG. 2 is a front view of a preferred embodiment of the apparatus of the present invention with panels in an access position and placed on a bolted flanged connection.
Figure 8:
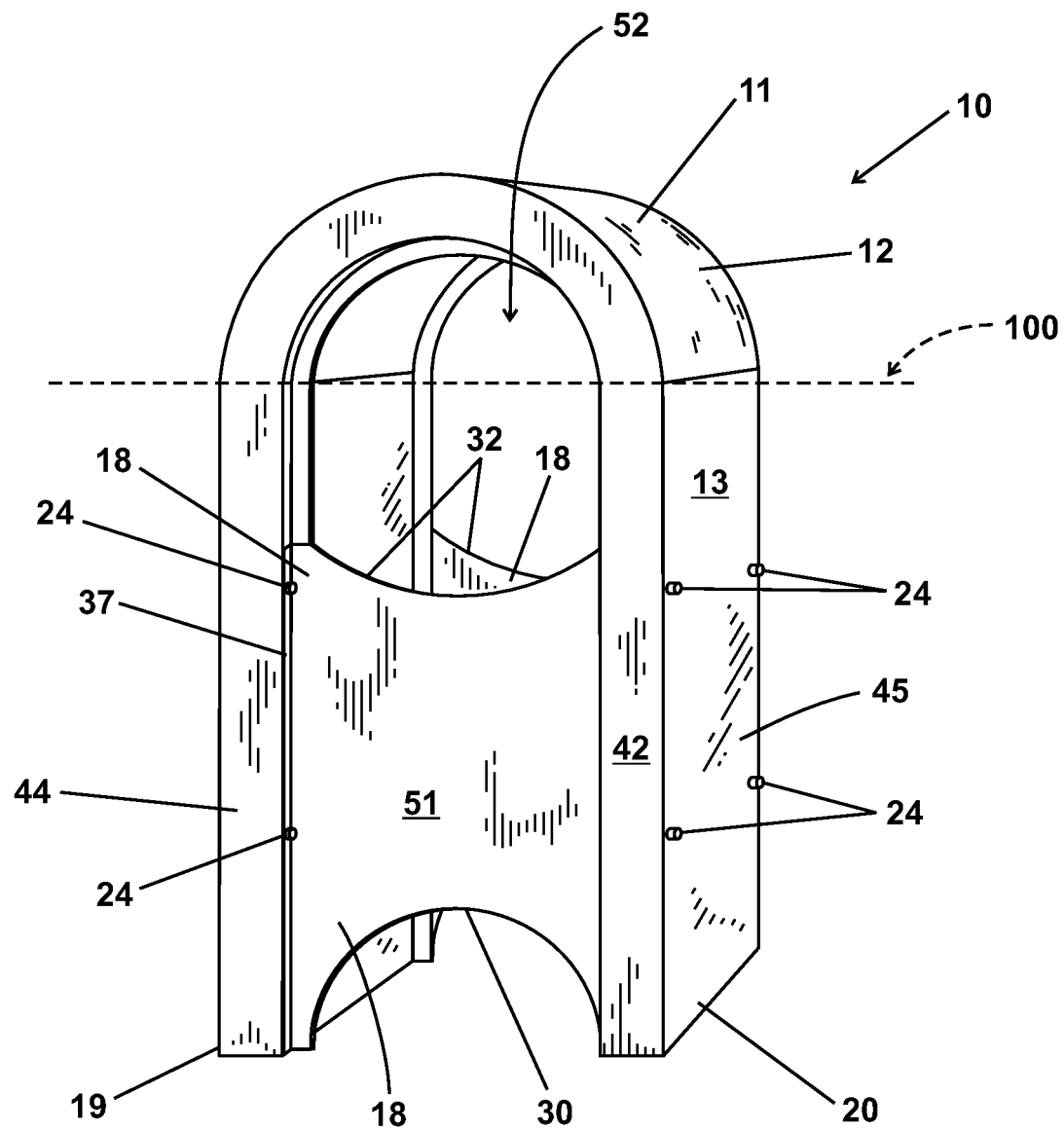
FIG. 8 is a perspective view of a preferred embodiment of the apparatus of the present invention with panels in an access position.

Panel 18 can be removed and replaced with the second curved edge 32 facing the closed end 16 of the housing 12, as seen in FIGS. 1, 2, and 8. Second curved edge 32 can be curved such that the bolts 23 on bolted flange connection 22 can be uncovered when the panel 18 is placed with the second curved edge 32 facing the closed end 16 of the housing 12. In this position, a user can then tighten the exposed bolts 23 to stop a leak.

Housing 12 can be rotated in a clockwise or counter clockwise direction, as indicated by arrow 41 in FIG. 22, around bolted flange connection 22 in order to expose different bolts 23 and nuts 25 for tightening until the leak is stopped. Additionally, the ability of housing 12 to rotate about the bolted flange connection 22 allows a user to direct the flow of a leak 57 into a drip pan 28 (see FIG. 9) as the leak 57 can flow out of the housing 12 to open side/end or throat 17.

Figure 5:
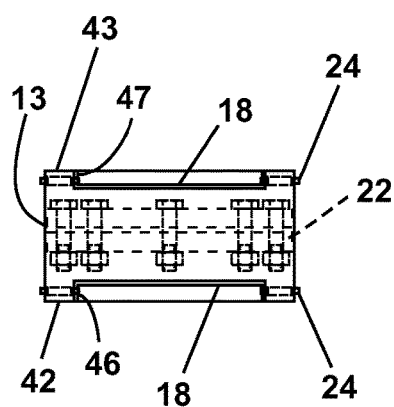
FIG. 5 is a top view of a preferred embodiment of the apparatus of the present invention on a bolted flanged connection.
Figure 11:
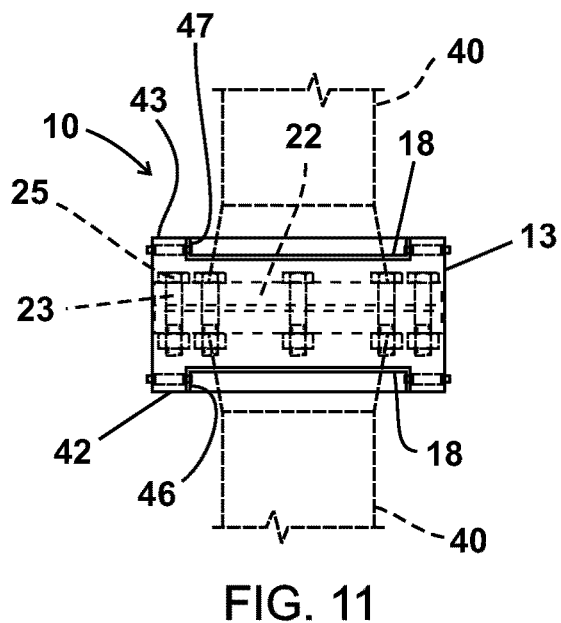
FIG. 11 is a top view of a preferred embodiment of the apparatus of the present invention on a bolted flanged connection.

FIGS. 5 and 11 show top views of a preferred embodiment of housing 12, with the panel 18 in place. FIGS. 1, 2, and 8 show the panel 18 in place with the second curved edge 32 facing the closed end 16 of the housing 12, allowing access to the bolts 23 and nuts 25. FIGS. 9, 12, 14, 16, 18-19 and 22 show panel 18 in place with the first curved edge 30 facing the closed end 16 of the housing 12, and thereby preventing access to the bolts 23 and nuts 25.

Figure 4:
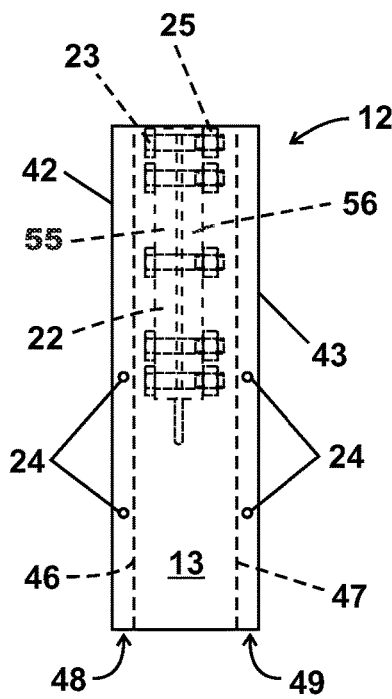
FIG. 4 is a side view of a preferred embodiment of the apparatus of the present invention on a bolted flanged connection.
Figure 10:
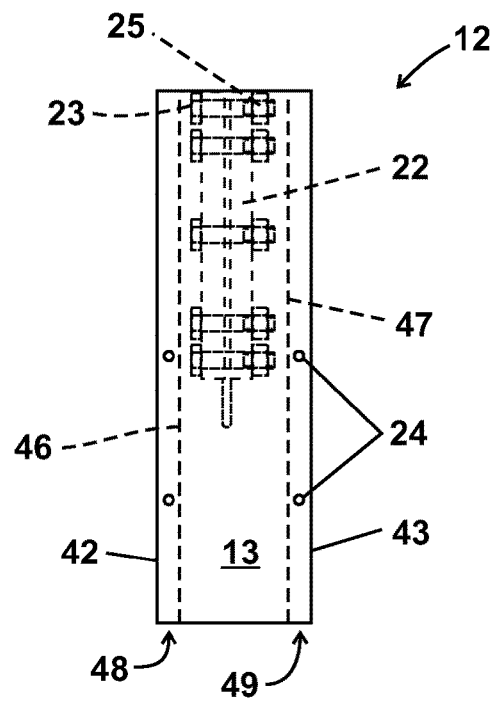
FIG. 10 is a side view of a preferred embodiment of the apparatus of the present invention on a bolted flanged connection.
Figure 17:
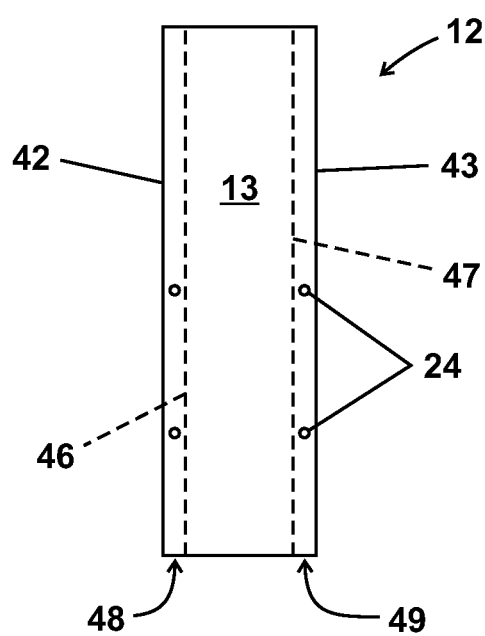
FIG. 17 is a side view of a preferred embodiment of the apparatus of the present invention.

FIGS. 4, 10, and 17 show side views of preferred embodiments of the apparatus 10 present invention.

Figure 21:
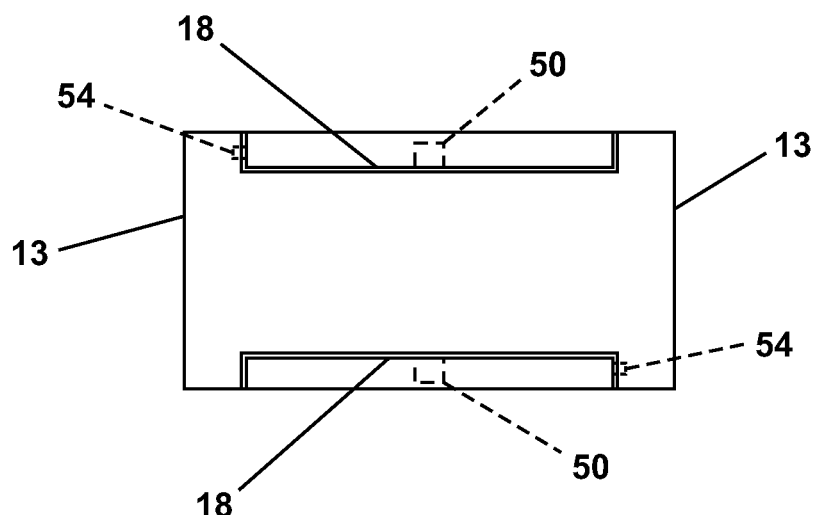
FIG. 21 is a bottom view of a preferred embodiment of the apparatus of the present invention.

FIG. 21 shows a view of open side/end or throat 17 of the housing 12 of the apparatus 10 of the present invention.

FIGS. 5 and 11 show views of preferred embodiments of the apparatus 10 of the present invention from the closed end 16 of the housing 12 of the apparatus 10.

Figure 6:
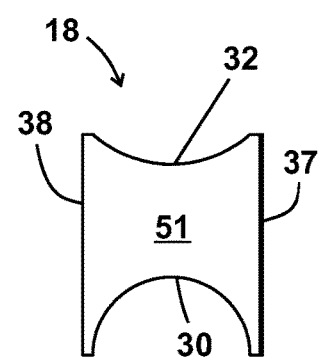
FIG. 6 is a front view of a panel of a preferred embodiment of the apparatus of the present invention.
Figure 7:
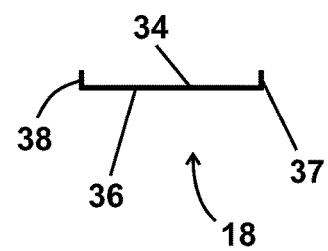
FIG. 7 is a top view of a panel of a preferred embodiment of the apparatus of the present invention.
Figure 12:
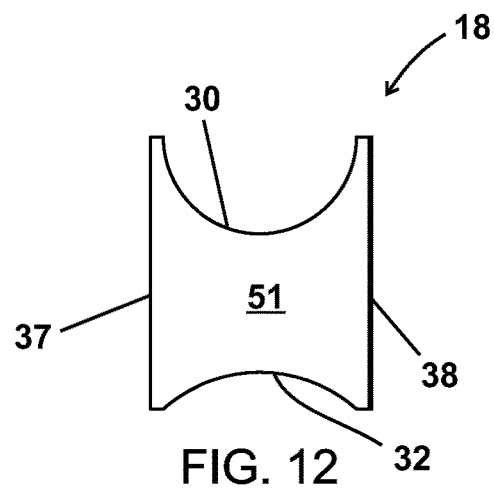
FIG. 12 is a front view of a panel of a preferred embodiment of the apparatus of the present invention.
Figure 13:
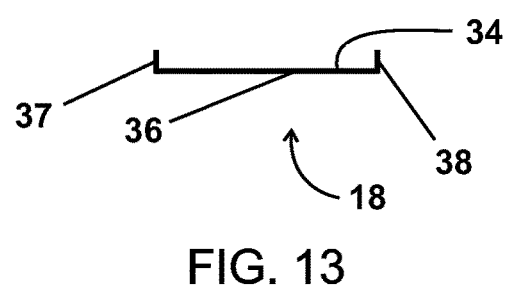
FIG. 13 is a top view of a panel of a preferred embodiment of the apparatus of the present invention.
Figure 19:
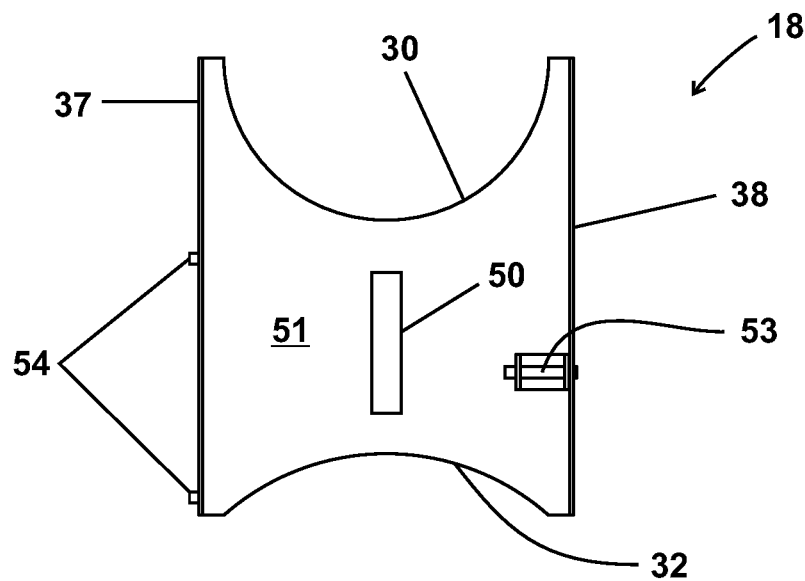
FIG. 19 is a front view of a panel of a preferred embodiment of the apparatus of the present invention.
Figure 20:
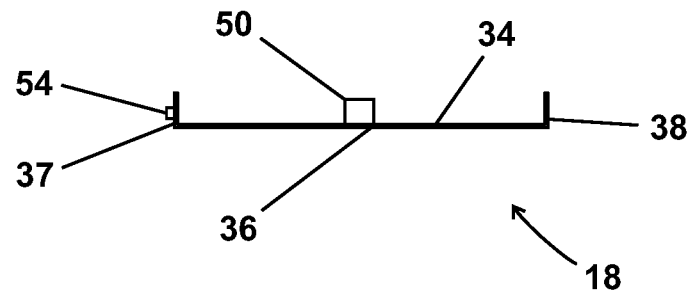
FIG. 20 is a top view of a panel of a preferred embodiment of the apparatus of the present invention.

FIGS. 6, 12 and 19 show front views of preferred embodiments of the panel 18 of the present invention. FIGS. 7, 13 and 20 show top views of preferred embodiments of the panel 18 of the present invention.

FIG. 22 is a perspective view of one embodiment of the apparatus of the present invention placed on a bolted flanged connection 22 of two pipe or tubing sections 40 with panels 18 secured in a position where curved edge 30 of each panel is facing closed end 16 and covering bolts 23 and nuts 25.

Housing 12 is preferably a U-shape with a curved section 11 and a pair of straight sections 44, 45. In various embodiments, housing 12 can include a wall 13, front and rear walls 42, 43 perpendicularly extending from the top wall 13, two lip sections 46, 47 perpendicularly extending from the front and rear walls 42, 43.

In various embodiments, the housing 12 can be sized and shaped to allow for a bolted flanged connection 22 of two pipe or tubing sections 40 to be placed between the straight sections 44, 45 such that the section 46, 47 of the housing 12 along the curved section 11 can be adjacent to the two pipe or tubing sections 40 and the straight sections 44, 45 can extend beyond the bolted flanged connection 22. Piping or tubing 40 can extend through openings.

In various embodiments, the apparatus 10 can be sized for a 6" SCH. 150 flange 22. One embodiment of the present invention has a curved section that can be about 5¹¹⁄₁₆" in height with a recessed inner diameter of about 7³⁄₁₆", an inner diameter (not recessed) of about 8⅛" and an outer diameter of about 11⅜". These dimensions are preferably designed to accommodate a standard size flanged, bolted connection 22 such that the housing 12 will not fit over the bolted flange connection 22 unless bolts 23 and nuts 25 are properly tightened.

One embodiment of the present invention has two straight sections 44, 45, each with a height of about 1' 4⅞" and a distance of about 7³⁄₁₆" between the inner recessed parts of the two straight sections 44, 45, a distance of about 8⅛" between the inner, non-recessed parts of the two straight sections 44, 45, and an outer distance of about 11⅜" between the outermost parts of the two straight sections 44, 45.

In one embodiment of the present invention where the curved section 11 is on top of the straight sections 44, 45, the height of the apparatus can be about 1' 10⁹⁄₁₆".

In one embodiment of the present invention, pins 24 that can be part of the lock mechanism 26 protrude from both the inner surface and from the outer surface of each straight sections 44, 45. In one embodiment of the present invention, the pins 24 (that protrude from the inner and outer surfaces of the straight sections 44, 45) can be about 4⅞" from the bottom of the straight sections 44, 45. In one embodiment of the present invention can be another set of pins 24 (that protrude from the inner and outer surfaces of the straight sections 44, 45) that can be located about 7⅛" above the other pins 24. In one embodiment of the present invention, the pins 24 have a diameter of about ⁷⁄₁₆". In one embodiment of the present invention, the straight sections 44, 45 can have a width (outer distance) of about 6¾" and an inner distance of about 4½". In one embodiment of the present invention, when the pins 24 are in the extended position, the length of each pin that is within the interior of the straight sections 44, 45 can be about 1⅜". In one embodiment of the present invention, the panel 18 can have a height of about 1' ½" and a length of about 7⅞" and the first curved edge 30 can have a radius of about 7³⁄₁₆".

The housing 12, panels 18, and pins 24 of the present invention can be made out of plastic, metal, fiberglass, rubber, carbon fiber or other suitable material.

In various embodiments, apparatus 10 can be sized for an 8" SCH. 150 flange 22. One embodiment of the present invention 10 has a curved section 11 of housing 12 that can be about 6¹⁵⁄₁₆" in height with a recessed inner diameter of about 9³⁄₁₆", an inner diameter (not recessed) of about 10⅝" and an outer diameter of about 1' 1⅞". One embodiment of the present invention has two straight sections 44, 45, each with a height of about 1' 6³⁄₁₆" and a distance of about 9³⁄₁₆" between the inner recessed parts of the two straight sections 44, 45, a distance of about 10⅝" between the inner, non-recessed parts of the two straight sections 44, 45, and an outer distance of about 1' 1⅞" between the outer most parts of the two straight sections 44, 45. In one embodiment of the present invention where the curved section 11 of housing is secured to the top of the straight sections 44, 45, the height of the apparatus 10 can be about 2' 1⅛". In one embodiment of the present invention, pins 24 that can be part of lock mechanism 26 can protrude from both the inner surface and from the outer surface of the two straight sections 44, 45. In one embodiment of the present invention, pins 24 (that protrude from the inner and outer surfaces of the straight sections 44, 45) can be about 5¹¹⁄₁₆" from the bottom of the straight sections 44, 45. In one embodiment of the present invention can be another set of pins 24 (that protrude from the inner and outer surfaces of the straight sections 44, 45) that can be located about 6¾" above the other pins 24. In one embodiment of the present invention, pins 24 can have a diameter of about ⁷⁄₁₆". In one embodiment of the present invention, the straight sections 44, 45 can have a width (outer distance) of about 7⁵⁄₁₆" and an inner distance of about 5". In one embodiment of the present invention, when pins 24 are in an extended position, the length of each pin 24 that is within the interior of the straight sections 44, 45 can be about 1⅜".

In one embodiment of the present invention, panel 18 can have a height of about 1' 1" and a length of about 10⅜", and first curved edge 32 can have a radius of about 9³⁄₁₆".

In various embodiments, a first portion of the top wall 13, front wall 42, and inner wall/lip section 46 extending from the front wall 42 can define a first channel 48.

In various embodiments, a second portion of the top wall 13, rear wall 43, and inner wall/lip section 47 extending from the rear wall 43 define a second channel 49.

The interior channels 48, 49 preferably extend continuously through the curved section 11 and straight sections 44, 45 to preferably direct fluid leaking from a bolted flanged connection 22. Interior channels 48, 49 make up a main interior channel that continuously extends through the curved section 11 and plurality of straight sections 44, 45. In various embodiments, the interior channels 48, 49 have a width that can be preferably at least equal to the width of a bolt head of the bolted flanged connections 22.

FIGS. 6-7, 12-13, 18-20 are views of a panel 18 of various embodiments of the present invention. The apparatus 10 preferably includes at least one removable door or panel 18. The panels 18 of various embodiments are sized and shaped to fit between the two straight sections 44, 45 of housing 12 adjacent to the recessed portion/lip sections 46, 47. As shown in FIGS. 6-7, 12-13, 18-20 of various embodiments, panels 18 include a main portion/section 51 having an outer surface 34 and inner surface 36, straight side walls/edges 37, 38 preferably perpendicularly extending from main portion/section 51. When removably secured to housing 12, the lower ends of walls/edges 37, 38 of panel 18 are preferably positioned near the bottom wall/lower end portion 15 of the housing 12 and walls/edges 37, 38 of panel 18 are preferably adjacent to the lip sections 46, 47 of housing 12.

The main portion/section 51 of panel 18 of various embodiments can have a first curved edge 30 and a second curved edge 32. The first curved 30 edge preferably has a different curvature from the second curved edge 32 such that when the first curved edge 30 is facing the closed end 16 of the housing 12, the bolts 23 and nuts 25 of the bolted flange connection 22 are not accessible. When the second curved edge 32 is facing the closed end 16 of the housing 12, the bolts 23 and nuts 25 of the bolted flange connection 22 are accessible for a user to tighten or loosen them.

Figure 14:
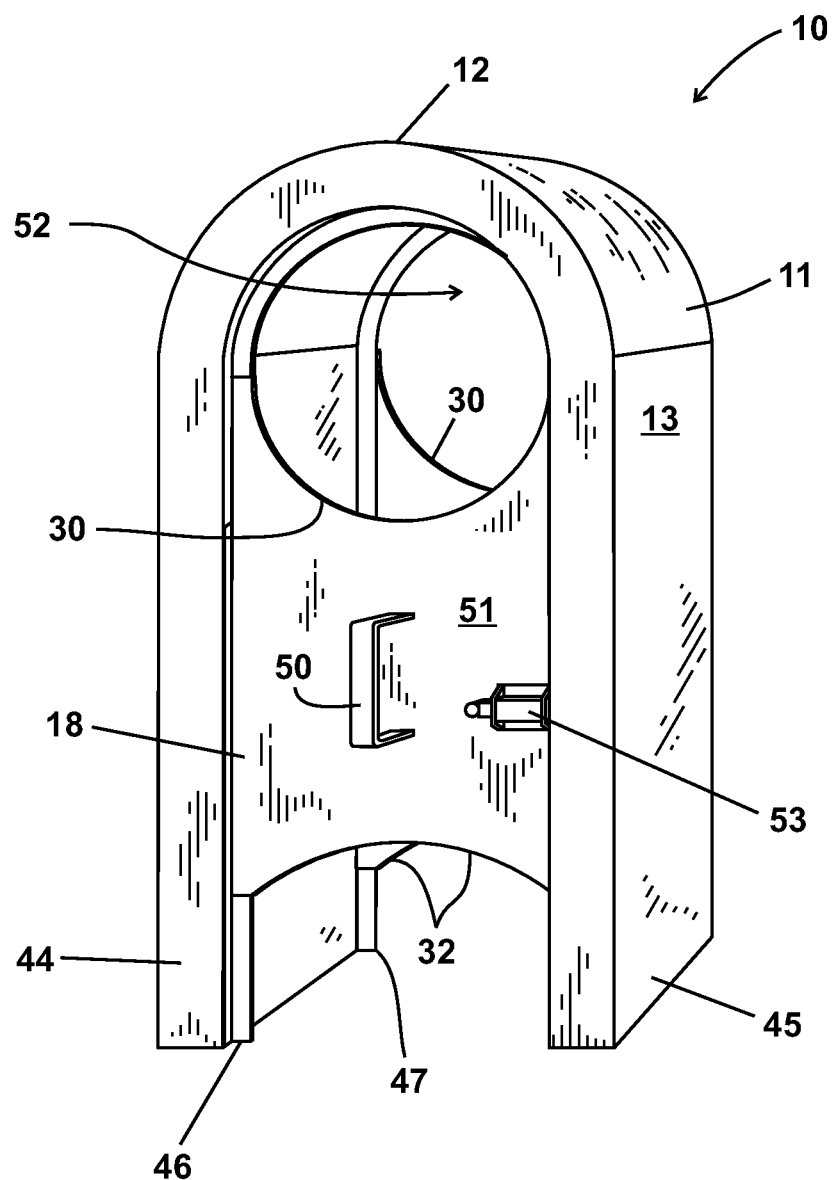
FIG. 14 is a perspective view of a preferred embodiment of the apparatus of the present invention with panels in a no-access position.
Figure 15:
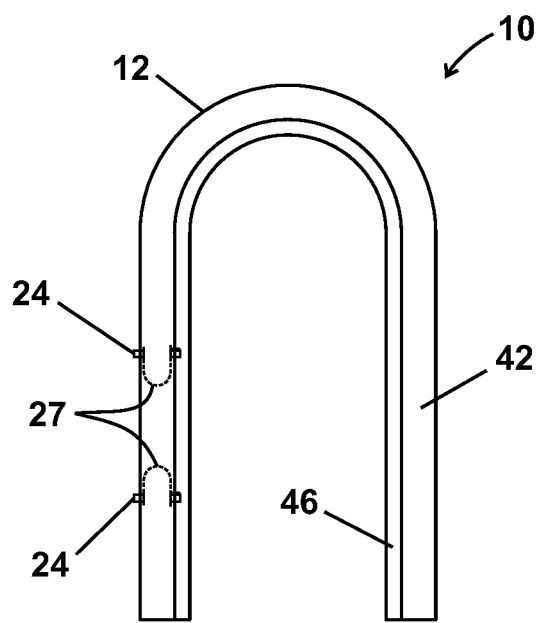
FIG. 15 is a front view of a preferred embodiment of the apparatus of the present invention without panels.
Figure 16:
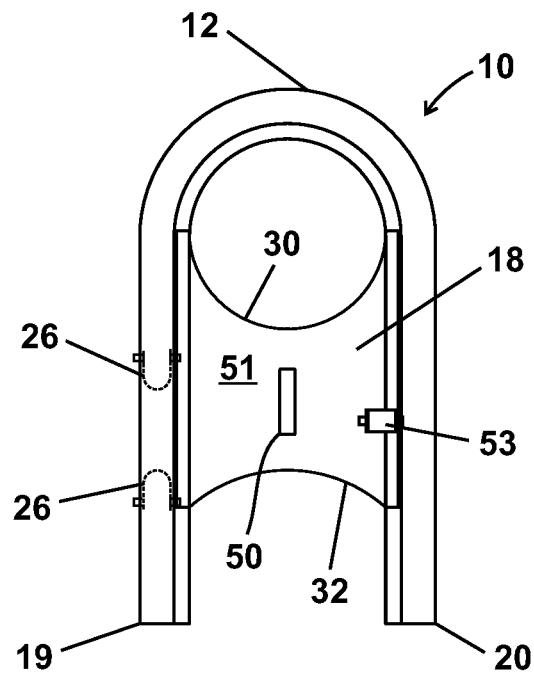
FIG. 16 is a front view of a preferred embodiment of the apparatus of the present invention with panels in a no-access position.

Panel 18 can preferably have handle 50 preferably located on the outer surface 34 of main portion 51, as seen in FIG. 14. Handle 50 preferably assists a user to removably secure panel 18 from housing 12. The panel 18 can be removed and rotated 180 degrees, and then secured back into housing 12.

In various embodiments, the housing 12 can have a plurality of openings located on the recessed portion or lip section 46, 47. Panel 18 can have a plurality of openings located on the two walls/edges 37, 38. When panel 18 is removably secured to the housing 12 in various embodiments, the plurality of openings on panel 18 can be preferably aligned with the plurality of openings of the housing 12 for receiving pins 24 or some other suitable locking mechanism 26, as seen for example in FIGS. 2-3, 9.

In various embodiments, the apparatus 10 includes one or more locking mechanisms 26 for removably securing panel 18 to housing 12. In other embodiments, the apparatus 10 includes a plurality of locks or pins 24. In other embodiments, the apparatus includes one, two, three, four, or more locking mechanisms 26.

Figure 18:
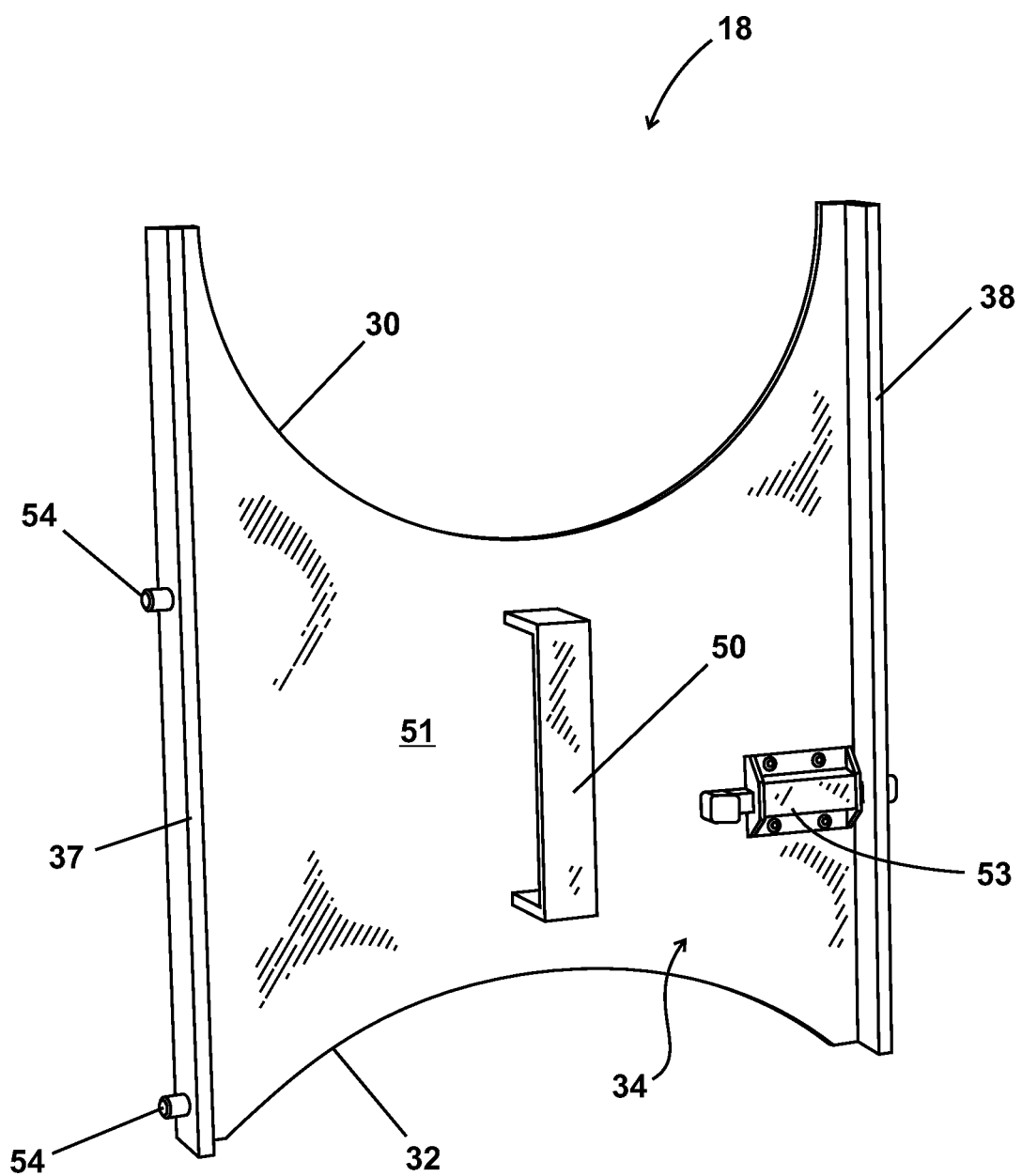
FIG. 18 is a perspective view of a preferred embodiment of a panel of the apparatus of the present invention.

In various embodiments, the apparatus 10 can include a sliding latch or bolt locking mechanism 53, as seen in FIG. 18. Sliding latch or bolt locking mechanism 53 can be located on each panel 18. Sliding latch or bolt locking mechanism 53 can be located near either side or edge 37, 38 of panel 18. The other side or edge 37, 38 that does not have sliding latch or bolt lock 53 can have pins 54 that can be inserted into lip section 46, 47 of housing 12, in order to secure panel 18.

The locking mechanism 26 of various embodiments can removably secure panel 18 in a first position where the first curved edge 30 can be adjacent to the two pipe or tubing sections 40 such that the circumference of the two pipe or tubing sections 40 can be adjacent to the lips/recessed portions/sections 46, 47 of housing 12 along the curved section 11 and first curved edge 30 of the panels 18.

In an alternate embodiment, there may be only one panel 18. In an alternate embodiment one or two panels 18 may be attached to housing 12 via a hinge, for example, on one of the straight sides/edges 37, 38, allowing the panel 18 to open and close on the hinge like a door (not shown).

The locking mechanism 26 of various embodiments can also removably secure panels 18 in a second position where the second curved edge 32 is positioned below the bolted flanged connection 22 such that a portion of the bolted flanged connection 22 is visible.

The locking mechanism 26 can include a spring lock comprising a plurality of pins 24 and a spring 27 such that in an extended state the spring 27 applies a springing force pushing the plurality of pins 24 outward and in a retracted state an opposing force overcoming the springing force to pushes the plurality of pins 24 inward. In various embodiments, the spring 27 can be located within the interior channel 48, 49 when the spring lock 26 removably secures panels 18 in either the first or second positions in the extend state where the pins 24 extend through the plurality of openings of the housing 12 and panel 18, as seen for example in FIGS. 2-3.

In various embodiments, the apparatus 10 can be polymer-pressed, metal, carbon fiber, plastic, rubber, fiberglass, or other suitable material.

In one embodiment of the present invention, bolts 23 and nuts 25 can be covered, preferably by panels 18, while the transfer of liquid through pipes, hoses, or tubing sections 40 is going on. That way, if the bolted flange connection 22 or gasket between the flanges starts to leak, it will be contained within housing 12 and directed into a containment device 28.

In various embodiments, the straight sections 44, 45 of the removable housing 12 can be located adjacent to the container 28.

In various embodiments, the container 28 can have conduit for draining fluid directed by the removable housing 12 to the container 28. The container 28 can be preferably sized and shaped to contain fluid directed by the removable housing 12 to the container 28. The container 28 may be of any suitable size and shape. In some embodiments, the drip pan 28 may be about 6" to 7" wide.

One embodiment of the present invention preferably allows for access to the bottom bolts 23 and nuts 25, so that if a person is breaking the bolted flange connection 22 loose, that person can get to the bolts 23 and nuts 35 to loosen up the bolted flange connection 22. In one embodiment of the present invention, when the bolts 23 and nuts 25 on any bolted flange connection 22 are loosened, the product is still preferably contained in the pipeline and may spray out while loosening the bolts 23 and nuts 25. With the present invention 10, a person can now preferably loosen the bolted flange connection 22, and if any product is remaining in the line, it will preferably be directed down and away from the personnel doing the work.

One embodiment of the present invention contains and directs leakage 57 to a drip barrel or other such containment device 28 preferably at an angle of between about 0 degrees and 75 degrees relative to the horizontal line 100 around where the straight sections 44, 45 intersect with the curved section 11 or around where the pipes or tubing sections 40 are in the opening 52. Preferably, apparatus of the present invention 10 can contain leakage from bolted flange connection 22 at an angle of 1, 5, 10, 15, 20, 25, 30, 35, 40, 45, 50, 55, 60, 65, 70 or 75 degrees and any angle in between that range relative to the horizontal line 100 around where the straight sections 44, 45 intersect with the curved section 11 or around where the pipes or tubing sections 40 are in the opening 52. In various embodiments, the removable housing 12 is rotatable, as indicated by arrow 41 in FIG. 22, to allow the user to change the direction of the fluid flowing out of channels 48, 49 in housing 12.

In various embodiments are provided a method for directing leakage from bolted flanged connections 22 of pipe or tubing sections 40.

In various embodiments, a method for directing leakage from bolted flanged connections 22 of pipe or tubing sections 40 includes the steps of providing a removable housing 12 and placing the housing 12 over a bolted flanged connection 22. In various embodiments, the removable housing 12 includes a curved section 11, and two straight sections 44, 45, and interior channels 48, 49. The housing 12 of various embodiments can be sized and shaped to allow for a bolted flanged connection 22 of two pipe or tubing sections 40 to be placed between the straight sections 44, 45 such that the curved section 11 can be positioned adjacent to the two pipe or tubing sections 40 and the plurality of straight sections 44, 45 can extends beyond the bolted flanged connection 22.

In various embodiments, a method for directing leakage from bolted flanged connections 22 of pipe or tubing sections 40 includes the steps of providing one or more panels 18 and securing the one or more panels 18 to housing 12 such that the first curved edge 30 of the panels 18 are adjacent to the two pipe or tubing sections 40 such that the circumference of the two pipe or tubing sections 40 are adjacent to the housing 12 along the curved section 11 and the first curved edge 30 of the panels 18. The panels 18 of various embodiments can be sized and shaped to fit between the two straight sections 44, 45 of the housing 12.

In various embodiments, the method further includes the step of directing leakage within the housing 12 to a container 28. One embodiment of the present invention directs the leakage to a drip barrel or other such containment device 28 preferably at an angle of between about 0 degrees and 75 degrees relative to the horizontal line 100 around where the straight sections 44, 45 intersect with the curved section 11 or around where the flanges of the bolted connection 22 are in interior channels 48, 49. Preferably, apparatus of the present invention can contain leakage from the bolted flange connection 22 at an angle of 1, 5, 10, 15, 20, 25, 30, 35, 40, 45, 50, 55, 60, 65, 70 or 75 degrees and any angle in between that range relative to the horizontal line 100 around where the straight sections 44, 45 intersect with the curved section 11 or around where the pipes or tubing sections 40 are in the opening 52. In various embodiments, the removable housing 12 can be rotatable, as indicated by arrow 41 in FIG. 22, to the direction of the fluid flowing through the pipe/tubing.

Figure 3:
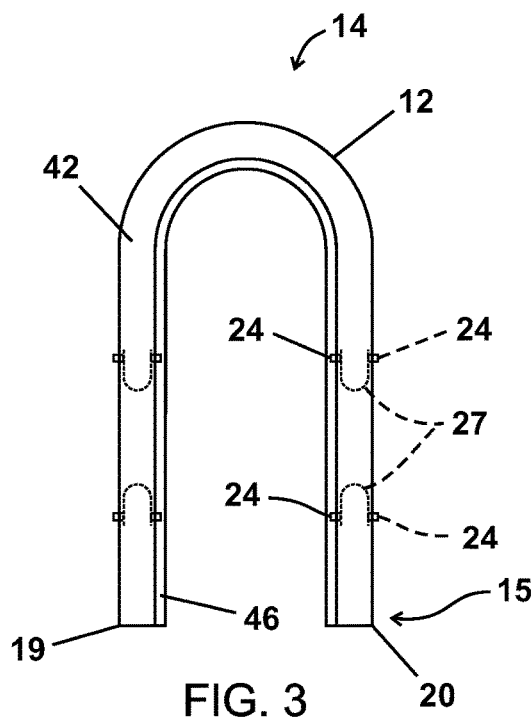
FIG. 3 is a front view of a preferred embodiment of the apparatus of the present invention without panels.

In various embodiments, the plurality of panels 18 can be secured to the housing 12 with a plurality of pins or spring locking mechanisms 26 located in the interior channel 48, 49 and including a plurality of pins 24 and a spring 27 such that in an extended state the spring 27 applies a springing force pushing the plurality of pins 24 outward and in a retracted state an opposing force overcoming the springing force to pushes the plurality of pins 24 inward, as seen in FIG. 2-3.

In various embodiments, the step of securing the panel 18 to housing 12 further includes transitioning the plurality of spring locks 26 to the retracted state, positioning the panel between the straight sections 44, 45, and transitioning the plurality of spring locks 26 to the extended state such that the plurality of spring locks 26 removably secures the panels 18 to the housing 12.

In various embodiments are disclosed a method of disassembling bolted flanged connections 22 of pipe or tubing sections 40.

In various embodiments, a method of disassembling bolted flanged connections 22 of pipe or tubing sections 40 includes the steps of providing a removable housing 12 and placing the housing 12 over the bolted flanged connection 22. In various embodiments, the removable housing 12 is a U-shape with a curved section 11, and two straight sections 44, 45, and an interior channel 48, 49. The housing 12 of various embodiments can be sized and shaped to allow for a bolted flanged connection 22 of two pipe or tubing sections 40 to be placed between the straight sections 44, 45 such that the curved section 11 is adjacent to the two pipe or tubing sections 40 and the plurality of straight sections 44, 45 can extend beyond the bolted flanged connection 22.

In various embodiments, a method of disassembling bolted flanged connections 22 of pipe or tubing sections 40 includes the steps of providing a plurality of panels 18 and securing the plurality of panels 18 to the housing 12 where the second curved edge 32 is positioned below the bolted flanged connection 22 such that a portion of the bolted flanged connection 22 is visible (see for example FIGS. 1-2). The plurality of panels 18 of various embodiments can be sized and shaped to fit between the two straight sections 44, 45 of the housing 12.

In various embodiments, a method of disassembling bolted flanged connections 22 of pipe or tubing sections 40 includes the steps of rotating the housing 12, indicated by arrow 41 in FIG. 22, such that different portions of the bolted flanged connection 22 are visible. In various embodiments, the housing 12 can be rotated 360 degrees along an axis formed by the bore of the pipe or tubing 40.

In various embodiments, a method of disassembling bolted flanged connections 22 of pipe or tubing sections 40 includes the steps of removing bolts 23 and nuts 25 from the bolted flanged connection 22 at the visible portions such that fluid remaining in the bolted flanged connection 22 is directed by the housing 12.

In various embodiments are disclosed a method for directing leakage from bolted flanged connections 22 of pipe or tubing sections 40 and disassembling bolted flanged connections 22.

In various embodiments, a method for directing leakage from bolted flanged connections 22 of pipe or tubing sections 40 and disassembling bolted flanged connections 22 includes the steps of providing a removable housing 12 and placing the housing 12 over the bolted flanged connection 22. The removable housing 12 of various embodiments includes a curved section 11, straight sections 44, 45, and interior channel 48, 49. In various embodiments, the housing 12 can be sized and shaped to allow for a bolted flanged connection 22 of two pipe or tubing sections 40 to be placed between the straight sections 44, 45 such that the curved section 11 is adjacent to the two pipe or tubing sections 40 and the plurality of straight sections 44, 45 extends beyond the bolted flanged connection 22. In various embodiments, a method for directing leakage from bolted flanged connections 22 of pipe or tubing sections 40 and disassembling bolted flanged connections includes the steps of providing a plurality of panels 18 and securing the plurality of panels 18 to the housing 12. In various embodiments, the panels 18 are secured to the housing 12 in such a manner that the first curved edge 30 of the plurality of panels 18 are adjacent to the two pipe or tubing sections 40 such that the circumference of the two pipe or tubing sections 40 can be adjacent to the housing 12 along the curved section 11 and the first curved edge 30 of the plurality of panels 18. The plurality of panels 18 of various embodiments can be sized and shaped to fit between the two straight sections 44, 45 of the housing 12 having a first curved edge 30 and a second curved edge 32. The leakage from the bolted flanged connection 22 can be preferably directed by the housing 12 to a containment device or drip pan 28. In various embodiments, the leakage can be directed to the drip pan 28 at an angle of about 0 to 75 degrees relative to the horizontal line 100 around where the straight sections 44, 45 intersect with the curved section 11. In various embodiments, the removable housing 12 is rotatable to the direction of the fluid flowing through the pipe/tubing 40. Preferably, apparatus of the present invention can contain leakage from the bolted flange connection 22 at an angle of 1, 5, 10, 15, 20, 25, 30, 35, 40, 45, 50, 55, 60, 65, 70 or 75 degrees and any angle in between that range relative to the horizontal line 100 around where the straight sections 44, 45 intersect with the curved section 11.

In various embodiments, a method for directing leakage from bolted flanged connections 22 of pipe or tubing sections 40 and disassembling bolted flanged connections 22 includes the step of securing the plurality of panels 18 to housing 12 where the curved edge 11 is positioned below the flanged connection 22 such that a portion of the bolted flanged connection 22 is visible when flow through the bolted flanged connection 22 is completed.

In various embodiments, a method for directing leakage from bolted flanged connections 22 of pipe or tubing sections 40 and disassembling bolted flanged connections 22 includes the step of rotating the housing 12, as indicated by arrow 41 in FIG. 22, such that different portions of the bolted flanged connection 22 can be visible.

In various embodiments, a method for directing leakage from bolted flanged connections 22 of pipe or tubing sections 40 and disassembling bolted flanged connections 22 includes the step of removing bolts 23 and nuts 25 from the bolted flanged connection 22 at the visible portions such that fluid remaining in the bolted flanged connection 22 is directed by the housing 12. In various embodiments, the housing 12 can be rotated 360 degrees along an axis formed by the bore of the pipe or tubing 40.

In various embodiments are disclosed a system for directing leakage from bolted flanged connections 22 of pipe or tubing sections 40 including a removable housing 12, a plurality of panels 18 and a locking mechanism 26.

In various embodiments, the housing 12 of a system for directing leakage from bolted flanged connections 22 of pipe or tubing sections 40 includes a curved section 11, plurality of straight sections 44, 45, and an interior channel 48, 49. In various embodiments, the housing 12 can be sized and shaped to allow for a bolted flanged connection 22 of two pipe or tubing sections 40 to be placed between the straight sections 44, 45 such that the curved section 11 can preferably be adjacent to the two pipe or tubing sections 40 and the plurality of straight sections 44, 45 extends beyond the bolted flanged connection 22.

In various embodiments, the plurality of panels 12 of a system for directing leakage from bolted flanged connections 22 of pipe or tubing sections 40 can be sized and shaped to fit between the two straight sections 44, 45 of the housing 12 having a first curved edge 30 and a second curved edge 32.

In various embodiments, the locking mechanism 26 of a system for directing leakage from bolted flanged connections 22 of pipe or tubing sections 40 can removably secure the plurality of panels 18 in a first position where the first curved edge 30 is adjacent to the two pipe or tubing sections 40 such that the circumference of the two pipe or tubing sections 40 can be adjacent to the housing 12 along the curved section 11 and the first curved edge 30 of the plurality of panels 12. Locking mechanism 26 can removably secure the plurality of panels 18 in a second position where the second curved edge 32 is positioned below the flanged connection 22 such that a portion of the bolted flanged connection 22 is visible.

In various embodiments, the housing 12 of a system for directing leakage from bolted flanged connections 22 of pipe or tubing sections 40 is placed over the bolted flanged connection 22 and the plurality of panels 18 are secured to the housing 12 in the first position such that leakage from the bolted flanged connection 22 is directed by the housing 12.

In various embodiments, the housing 12 directs leakage to a container 28, wherein the leakage is directed to the drip pan 28 at an angle of about 0 to 75 degrees relative to the horizontal line 100 around where the straight sections 44, 45 intersect with the curved section 11. In various embodiments, the removable housing 12 can be rotatable to the direction of the fluid flowing through the pipe/tubing 40.

In various embodiments, the plurality of panels 18 are secured to the housing 12 in the second position and the housing 12 is rotated such that different portions of the bolted flanged connection 22 can be visible where bolts 23 and nuts 25 can be removed from the bolted flanged connection 22 at the visible portions of the bolted flanged connection 22 such that fluid remaining in the bolted flanged connection 22 is directed by the housing 12.

A preferred embodiment of the present invention is an apparatus 10 for covering bolted flange connections 22 during fluid transfer in pipes or hoses 40 comprising a housing 12 and at least two panels 18, wherein the housing 12 has a top or upper end portion 14, a bottom or lower end portion 15, and a wall 13. Wall 13 can run the length of the top/upper portion 14 and bottom/lower portion 15 and be generally U-shaped. Housing has a closed end 16 and an open side/end or throat 17, the open end or throat 17 having a first leg 19 and a second leg 20. At least two panels 18 can be sized and shaped to fit in the open end or throat 17 of the housing 12, and wherein one of the at least two panels 18 can be removably attached to the housing 12.

The panels 18 can be preferably flat and have a main section or portion 51, an outer surface 34, an inner surface 36, a first straight edge 37, a second straight edge 38, a first curved edge 30, and a second curved edge 32, wherein the first and second straight edges 37, 38 correspond to straight sections 44, 45 of the open end or throat 17 of the housing 12, and wherein the panel 18 can be placed with the first curved edge 30 facing the closed end 16 of the housing 12. The first curved edge 30 is curved such that the bolts 23 and nuts 25 on the bolted flange connection 22 can be be covered by the panel 18 when the panel 18 is placed with the first curved edge 30 facing the closed end 16 of the housing 12. In this position, the bolts 23 and nuts 25 of the bolted flange connection 22 can be completely covered preventing spray or other leaking fluid from escaping the apparatus 10 from anywhere other than the open end or throat 17 of the housing 12. The panel 18 can be removed and replaced with the second curved edge 32 facing the closed end 16 of the housing 12. The second curved edge 32 is curved such that the bolts 23 and nuts 25 on the bolted flange connection 22 can be uncovered when the panel 18 is placed with the second curved edge 32 facing the closed end 16 of the housing 12. In this position, a user can then tighten the exposed bolts 23 and nuts 25 to stop a leak. The housing 12 can be rotated, as indicated by arrow 41 in FIG. 22, to expose different bolts 23 and nuts 25 for tightening until the leak is stopped. Additionally, the ability of the housing 12 to rotate about the bolted flange connection 22 allows the user to direct the flow of a leak into a drip pan 28 as the leak will flow out of the housing 12 via to open end or throat 17.

Preferably, the housing 12 can be sized and shaped such that housing 12 will not fit over a bolted flange connection 22 unless the bolts 23 and nuts 25 are properly tightened. This provides an extra precaution against leaks that are often caused by the bolted connections not being properly closed. The apparatus 10 preferably comes in multiple sizes that are sized and shaped to accommodate various standard bolted flange connections 22. The figures provide examples of some of the standard sizes.

The present invention also includes a method of using the apparatus 10 to prevent or contain spills during fluid transfer through a bolted flange connection 22. The method preferably comprises the steps of:
  (a) placing the housing 12 over the bolted flange connection 22;
  (b) placing one of the panels 18 on the bottom side/lower end portion 15 of the housing 12 with the first curved edge 30 of the panel 18 facing the closed end 16 of the housing 12;
  (c) placing one of the panels 18 on the top/upper end portion 14 of the housing 12 with the first curved edge 30 of the panel 18 facing the closed end 16 of the housing 12;
  (d) placing a drip pan 28 under the apparatus 10; and
  (e) beginning fluid transfer and watching for any leakage out of the open end or throat 17 of the housing 12.

If a leak occurs during the fluid transfer, a user can take the following steps to correct the leak without allowing the leaking product to be blown by windy conditions or misdirected:

(f) rotating the housing 12 to direct the leakage into the drip pan 28;

(g) removing one of the panels 18 and replacing it with the second curved edge/side 32 facing the closed end 16 of the housing 12;

(h) tightening the bolts 23 and nuts 25 that are now accessible;

(i) rotating the housing 12 to make additional bolts 23 and nuts 25 accessible for tightening; and (j) repeating steps (g)-(i) until the leak is stopped.

The apparatus 10 of the present invention may be used repeatedly. It is preferably made of plastic, PVC, or other suitable material that is lightweight, easily cleaned, and easily transferable. However, it may also be made of metal (e.g., stainless steel) or other suitable material.

PARTS LIST

The following is a list of parts and materials suitable for use in the present invention:

| Parts Number | Description |
|---|---|
| 10 | apparatus of the present invention |
| 11 | curved section of housing |
| 12 | housing |
| 13 | wall of housing |
| 14 | upper end portion of housing/top |
| 15 | lower end portion of housing/bottom of housing |
| 16 | closed side of housing/closed end |
| 17 | open side of housing/open end of housing/throat |
| 18 | removable door or panel |
| 19 | first leg of housing |
| 20 | second leg of housing |
| 22 | flange/flange connection/bolted connection |
| 23 | bolts of connection |
| 24 | pin |
| 25 | nut |
| 26 | locking mechanism |
| 27 | spring |
| 28 | drip pan |
| 30 | first curved edge of panel |
| 32 | second curved edge of panel |
| 34 | outer surface of panel |
| 36 | inner surface of panel |
| 37 | first straight edge of panel |
| 38 | second straight edge of panel |
| 40 | pipe/tube/hose section |
| 41 | arrow |
| 42 | front wall |
| 43 | rear wall |
| 44 | straight section |
| 45 | straight section |
| 46 | recessed portion/lip section |
| 47 | recessed portion/lip section |
| 48 | channel |
| 49 | channel |
| 50 | handle |
| 51 | main section/portion of panel |
| 52 | opening |
| 53 | sliding latch or bolt locking mechanism |
| 54 | pin |
| 55 | flange |
| 56 | flange |
| 57 | leak |
| 100 | horizontal line |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. An apparatus for capturing leakage from a flanged joint that includes multiple bolted connection of flanged pipe or flanged tubing sections comprising:

a) a removable housing that is sized and shaped to receive a bolted flanged connection of two pipe or tubing sections, each said pipe or tubing section including an annular flange, a bolt circle opening on each flange, and wherein bolted connections connect the flanges together at the bolt circle openings, the housing having an interior, a closed section having first and second ends and an interior channel, and a pair of leg sections, each said leg section having proximal and distal end portions, wherein each said proximal end portion is connected to a said closed section end and vertically extending downwardly below bolted flanged connection;

b) said leg sections being horizontally spaced apart and having an open throat that is sized and shaped to receive the bolted flanged connection upwardly into the closed section;

c) each of the leg sections having a fluid flow channel, wherein the combination of the interior channel and the leg flow channels create a main interior channel that extends continuously through the housing interior;

d) wherein in a first position the housing contains the bolted flanged connection and the pipe or tubing sections extend in generally opposite directions from the housing;

e) wherein the housing captures and directs any leakage from the bolted flanged connection into the main interior channel;

f) wherein the leakage freely flows through the main interior channel and out of the housing via the open throat;

g) one or more panels that removably secure the housing to the bolted flanged connection, said one or more panels being sized and shaped to fit in between the leg sections; and h) wherein said one or more panels having a first curved edge and a second curved edge, and wherein said one or more panels can be rotated from the first position having the first curved edge covering the bolted connections to a second position having the second curved edge providing access to the bolted connections.

2. The apparatus of claim 1, wherein the first curved edge has a curvature that is different from the second curved edge.

3. The apparatus of claim 1, wherein one or more locks can removably secure the one or more panels in the first position where the first curved edge is adjacent to the two pipe or tubing sections such that the circumference of the two pipe or tubing sections are adjacent to the housing along the closed section and the panel first curved edge.

4. The apparatus of claim 3, wherein the one or more locks can removably secure the one or more panels in a second position where the second curved edge is positioned below the bolted flanged connection such that a portion of the bolted flanged connection is accessible.

5. The apparatus of claim 1, wherein the closed section of the housing has a curvature matching the bolted flanged connections.

6. The apparatus of claim 1, wherein the main interior channel has a width that is at least equal to the width of a bolt head of the bolted flanged connections.

7. The apparatus of claim 1, wherein the leg sections comprise multiple plates.

8. The apparatus of claim 1, wherein the leakage is directed to a containment device preferably at an angle of between about 0 degrees and 75 degrees in one degree increments, relative to a horizontal line around where the pipes or tubing sections are in the channels.

9. The apparatus of claim 1, further comprising a handle on each of said one or more panels.

10. An apparatus for directing leakage from bolted flanged connections of pipe or tubing sections comprising:
   a) a removable housing that is sized and shaped to receive a bolted flanged connection of two pipe or tubing sections, the housing having an upper closed end, a lower open end, an interior, and a main channel that extends along the housing interior;
   b) the housing upper closed end including a top section having first and second ends, and the housing lower open end including a pair of spaced apart legs, each said leg connected to a said top section end, wherein said housing lower open end is sized and shaped to receive the bolted flanged connection upwardly into the top section;
   c) one or more panels sized and shaped to fit in between the legs, the one or more panels having a first curved edge and a second curved edge, wherein the first curved edge has the same curvature as the pipe or tubing sections and the second curved edge has the same curvature as the circumference of the flanged connection;
   d) wherein in a first position the top section is adjacent to the two pipe or tubing sections and the legs extend beyond the bolted flanged connection;
   e) the one or more panels can be removably secured in the first position where the first curved edge is adjacent to the two pipe or tubing sections such that the circumference of the two pipe or tubing sections are adjacent to the housing along the top section and the first curved edge of the one or more panels;
   f) wherein the one or more panels can be rotated in a second position where the second curved edge is positioned below the flanged connection such that a portion of the bolted flanged connection is accessible;
   g) wherein in both the first and second positions the housing captures and directs any leakage from the flanged connection into the housing main channel, and the leakage freely flows out of the housing via the lower open end.

11. The apparatus of claim 10, wherein the main channel continuously extends through the top section and pair of legs.

12. The apparatus of claim 10 wherein the legs comprise multiple plates.

13. The apparatus of claim 10, wherein the leakage is directed to a containment device preferably at an angle of between about 0 degrees and 75 degrees in one degree increments, relative to a horizontal line around where the pipes or tubing sections are in the channel.

14. The apparatus of claim 10, wherein the top section of the housing is curved and has a curvature matching the bolted flanged connection.

15. The apparatus of claim 10, wherein the main channel has a width that is at least equal to the width of a bolt head of the bolted flanged connections.

* * * * *